United States Patent [19]

Flannery et al.

[11] 4,440,576

[45] Apr. 3, 1984

[54] HYDRAULIC CEMENTS PREPARED FROM GLASS POWDERS

[75] Inventors: James E. Flannery; Joseph F. Mach; Dale R. Wexell, all of Corning, N.Y.

[73] Assignee: Corning Glass Works, Corning, N.Y.

[21] Appl. No.: 424,030

[22] Filed: Sep. 27, 1982

[51] Int. Cl.³ .............................................. C04B 7/00
[52] U.S. Cl. ........................................ 106/85; 106/75; 501/55; 501/68
[58] Field of Search ...................... 501/55, 68; 106/74, 106/85

[56] References Cited

U.S. PATENT DOCUMENTS

| | | | |
|---|---|---|---|
| 3,498,802 | 3/1970 | Bickford et al. | 501/55 |
| 3,720,527 | 3/1973 | Farrauto et al. | 106/85 |
| 3,743,525 | 7/1973 | Farrauto et al. | 106/85 |
| 3,811,853 | 5/1974 | Bartholomew et al. | 501/55 |

*Primary Examiner*—James Poer
*Attorney, Agent, or Firm*—C. S. Janes, Jr.

[57] ABSTRACT

The present invention is concerned with the preparation of hydraulic cements, demonstrating high mechanical strength, long term resistance to attack by moisture, and virtual freedom from creep, from glass powders consisting essentially, expressed in terms of mole percent on the oxide basis, of about 60–76% $SiO_2$, 15–30% $K_2O$, and 2–15% total of at least one metal oxide selected from the group of 0–10% $Al_2O_3$, 0–5% $V_2O_5$, 0–5% $TiO_2$, 0–5% $MoO_3$ and 0–5% $WO_3$. The cements exhibit particular utility in forming strong cellular ceramic articles. The glass powders may contain a phosphate component in which case the composition ranges are limited to 68–76% $SiO_2$, 18–24% $K_2O$, 2–4.5% $P_2O_5$ with the molar ratio $K_2O:P_2O_5$ ranging between 5 and 10, and 2–5% total of at least one metal oxide selected from the group of $Al_2O_3$, $MoO_3$, $V_2O_5$ and $WO_3$.

14 Claims, No Drawings

HYDRAULIC CEMENTS PREPARED FROM GLASS POWDERS

BACKGROUND OF THE INVENTION

Commercial hydraulic cements are powders customarily prepared from alumina, silica, lime, iron oxide, and magnesia by firing in a kiln. When mixed with water, they form a plastic mass that hardens via chemical combination and by gelation and crystallization. Thus, the conventional hydraulic cement, of which Portland cement is probably the most well-known example, involves the crystallization of powders.

Contrariwise, U.S. Pat. Nos. 3,720,527 and 3,743,525 disclosed that crystallization was not mandatory for the development of strength in hydraulic cement. Rather, certain glass powders would behave like hydraulic cements, i.e., those powders would react with water and subsequently harden to a solid amorphous body.

U.S. Pat. No. 3,720,527 was concerned with the production of hydraulic cements from glass powders consisting essentially, in weight percent, of about 15–85% $Na_2O$ and/or $K_2O$, 10–80% $SiO_2$, and 3–20% $P_2O_5$. No more than 5% total of such compatible metal oxides as MgO, CaO, SrO, BaO, CdO, ZnO, PbO, and $B_2O_3$ could be tolerated.

The cements were prepared by melting a batch for a glass having a composition within the operable ranges. The melt was cooled to a glass and the glass comminuted into particles sufficiently minute to pass a 140 mesh and, preferably, a 200 mesh United States Standard Sieve. When the cement was used, water was added thereto in water-to-glass ratios of 0.25–0.50. In general, those hydraulic cements set up within an hour at room temperature.

The addition of water to the glass powder caused a vigorous reaction to occur with the consequent generating of large quantities of heat. This liberation of heat was derived from the very rapid setting reaction demonstrated by the cements. As initially prepared, the cements exhibited relatively poor chemical durability but, when heated to 150°–200° C. to expel absorbed water, the durability thereof was significantly improved.

U.S. Pat. No. 3,743,525 disclosed the production of hydraulic cements from glass powders consisting essentially, in weight percent, of 20–80% $SiO_2$, 5–40% $Na_2O$ and/or $K_2O$, 5–70% RO, wherein RO consisted of 0–30% MgO, 0–50% CaO, 0–70% SrO, and 0–35% BaO, and 5–15% $NaH_2PO_4$ and/or $KH_2PO_4$. The incorporation of the $H_2PO_4$-anion into the glass substantially enhanced the reactivity thereof and often improved the compressive strength of the final cement.

Glass powders of the proper composition were prepared which passed a 140 mesh and, preferably, a 200 mesh United States Standard Sieve. The powder was blended into water in water-to-powder ratios of about 0.25–0.50; room temperature or slightly elevated temperatures normally being employed to expedite the reaction. The use of boiling water, however, was avoided.

U.S. Pat. No. 3,498,802 also discussed the preparation of hydraulic cements from glass powders. That patent described the formation of alkali metal silicate glass powders which exhibited thermoplasticity and which, when contacted with water, would set up in like manner to hydraulic cement. In carrying out the process, glass particles passing a 100 mesh United States Standard Sieve and consisting essentially, in weight percent, of 80–94% $SiO_2$ and 6–20% $Na_2O$ and/or $K_2O$ were exposed to a gaseous environment containing at least 50% by weight steam at a pressure of at least one atmosphere and at a temperature of 100°–200° C. The exposure was continued until at least a surface portion of the powders contained up to about 30% by weight of water.

Unfortunately, those three classes of cements suffered from two principal failure modes, viz., creep, i.e., deformation under load or under its own weight, and slow dissolution in water. It would be highly desirable to provide amorphous hydraulic cements which demonstrate high strength, long term durability in contact with water, and essential freedom from creep under full cure.

Potassium silicates are well known to the industrial arts, most frequently being marketed as an aqueous solution or colloidal solution because of their hygroscopic nature. The gelation or polymerization of aqueous alkali metal silicates through the evaporation of water therefrom as, for example, the simple drying of a potassium silicate solution to an amorphous mass, is likewise quite familiar to the art. Nevertheless, such amorphous masses commence crystallizing after a relatively brief period of time and are, of course, highly subject to attack by moisture. Alkali metal silicates have been and are currently employed as binders, particularly in the formation of articles from particles of inorganic materials, e.g., refractory bricks. That utility, however, is conditioned upon a reaction taking place between the alkali metal silicate and the matrix particles to thereby eliminate the intrinsic hygroscopic character of the silicate.

The instant invention is designed to utilize the bonding qualities of potassium silicates as cements, while at the same time providing means for inhibiting the inherent hygroscopic behavior thereof. Accordingly, a primary objective of the present invention is to provide amorphous hydraulic cements which display high strength, long term durability when in contact with moisture, and essential freedom from creep after full cure; creep being defined as deformation under load or under its own weight.

SUMMARY OF THE INVENTION

That objective can be accomplished with glass powders consisting essentially, expressed in terms of mole percent on the oxide basis, of 60–76% $SiO_2$, 15–30% $K_2O$, and 2–15% total of at least one metal oxide selected from the group in the indicated proportion of 0–10% $Al_2O_3$, 0–5% $V_2O_5$, 0–5% $TiO_2$, 0–5% $MoO_3$, and 0–5% $WO_3$. It is not mathematically possible to precisely convert ranges expressed in mole percent to weight percent. A reasonable approximation thereof, however, yields regimes of base glass components, delineated in terms of weight percent, of about 45–75% $SiO_2$, 23–40% $K_2O$, and 2–25% total of at least one metal oxide selected from the group in the indicated proportion of 0–15% $Al_2O_3$, 0–10% $V_2O_5$, 0–11% $TiO_2$, 0–8% $MoO_3$, and 0–11% $WO_3$.

A phosphate component is not required in the present hydraulic cement glasses, but neither is it precluded. However, narrower ranges are preferred for the constituents in glasses containing phosphate. These glasses consist essentially, expressed in terms of mole percent on the oxide basis, about 18–24% $K_2O$, 68–76% $SiO_2$, up to 5% $P_2O_5$, preferably 2–4.5% and the molar ratio $K_2O:P_2O_5$ ranging between 5-10, preferably 8.5-9.5, and 2-5% total of at least one metal oxide selected from the group of $Al_2O_3$, $MoO_3$, $V_2O_5$, and $WO_3$. Again, although it is not mathematically possible to precisely convert those ranges expressed in mole percent to weight percent, an approximation thereof yields ranges of the base glass components, in weight percent, of about 23-32% $K_2O$, 55-65% $SiO_2$, and 4-9% $P_2O_5$. The metal oxides will range up to a maximum of about 5% $Al_2O_3$, 8% $MoO_3$, 7% $V_2O_5$, and 11% $WO_3$.

GENERAL DESCRIPTION OF THE INVENTION

Heretofore, it has generally been considered desirable, if not essential, to have a substantial phosphate component in hydraulic cement glasses. While phosphate is not precluded from the present glasses, the invention is grounded in the discovery that it is not essential and may be undesirable for some purposes.

In accordance with the invention then, it has been found that a selected range of potassium silicate glasses, modified by minor additions of at least one selected metal oxide, can provide superior hydraulic cement glasses. In particular these glasses provide good mechanical strength, long term durability to water attack, and essentially little or no tendency to creep.

In the absence of a phosphate component, at least 60 mole percent silica is required, but this should not exceed about 76%. Likewise, at least 15% $K_2O$ is required, but this should not exceed about 30 mole percent. Up to about 5% $P_2O_5$ is permitted, but silica contents in the upper part of the range, and restricted $K_2O$ contents are then preferred. In particular, the silica should be at least 68 mole percent and $K_2O$ should be 18-24% with the molar ratio $K_2O:P_2O_5$ being in the range 5-10, preferably 8.5-9.5.

Up to about 10 mole percent total of various compatible components such as BaO, $B_2O_3$, $Bi_2O_3$, CaO, CdO, CoO, $Cr_2O_3$, $Cs_2O$, F, $Fe_2O_3$, $Li_2O$, MgO, $MnO_2$, $MoO_3$, $Na_2O$, NiO, PbO, $Sb_2O_3$, $Rb_2O$, SrO, ZnO, and $ZrO_2$ may be incorporated to modify the melting behavior and/or the chemical and/or physical properties of the glass. Preferably, individual additions of those components will not exceed about 5 mole percent. For example, $Li_2O$, $Na_2O$, $Rb_2O$, and $Cs_2O$ may be substituted for $K_2O$ up to about 5 mole percent while still retaining the strength and transparency of the resultant cements. Above 7 mole percent $Na_2O$, $Rb_2O$, or $Cs_2O$, the resultant cements are hard and stable, but exhibit a granular texture and are opaque. At $Li_2O$ contents above 7 mole percent, the cements become soft and chalky. Additions of CuO and/or NiO up to 5 mole percent yield hard, stable, granular, and opaque cement bodies. With levels above 5 mole percent, however, the glass and water only partially react such that the cements become powdery. If desired, PbO may be substituted for $SiO_2$ in amounts up to 25-30 mole percent, thereby permitting the content of the latter to be reduced to about 50 mole percent, but the resultant cements are slow setting, granular, and opaque.

The presence of $V_2O_5$ exerts two particularly salutary effects upon the chemical and physical properties of the cements. Hence, it is believed that the inclusion of $V_2O_5$ promotes the solubility of $Al_2O_3$ in the base glass compositions, thereby allowing the incorporation of up to 10 mole percent $Al_2O_3$ while still yielding a transparent cement. Furthermore, it is postulated that $V_2O_5$ enhances the polymerization mechanism of the glass cement particles. This hypothesis is founded in the recognition that vanadium in the presence of oxide ion and/or water, exhibits considerable tendency to polymerization and promotes hydrolysis. In sum, it is theorized that the polymerizing and coordination behavior of the $V^{+5}$ moiety, in the presence of oxide ion and/or water, increases the crosslinking behavior of particles in the cement formation process. This combination of two factors increases the rate of cement formation and greatly enhances the chemical durability and strength of the cements.

$TiO_2$ appears to improve the chemical durability of the ion with $Al_2O_3$, the effect exceeds cements and, in combination with $Al_2O_3$, the effect exceeds the simple cumulative action of each alone. Amounts of $TiO_2$ greater than about 5 mole percent lead to an exothermic reaction which is difficult to control. Accordingly, for practical reasons the $TiO_2$ content will preferably be held between about 2-4 mole percent.

The most preferred composition will contain 2-4 mole percent $Al_2O_3$ and 2-4 mole percent $V_2O_5$ and/or $TiO_2$ and not more than 25 mole percent $K_2O$.

Inasmuch as the formation of cements is dependent upon the surface reactivity of finely-divided particles, $MoO_3$, $V_2O_5$, and $WO_3$, which are recognized as exerting a strong effect upon the surface tension of glass, were incorporated into the base glass composition to take advantage of that action. Additions in excess of about 2 mole percent yielded glasses displaying very fast curing times and the cements are dense, hard, and of high mechanical strength. Lesser amounts appeared to slow the reaction with water and yielded a cement of reduced chemical durability. Hygroscopicity of the glasses increases as the amount of $MoO_3$ and $WO_3$ increases. Glasses containing over 4 mole percent $MoO_3$ or $WO_3$ become very wet and cannot even be ground.

$B_2O_3$ may be effective in promoting melting of the glass but, inasmuch as it reduces the rate at which the glass reacts with water, care must be exercised in its use. Additions of alkaline earth metal oxides commonly slow the rate of reaction with water but the mechanical strength and chemical durability of the cement are frequently enhanced thereby. Small amounts of fluoride seem to impart a positive effect upon the mechanical strength exhibited by the cements, but larger quantities deleteriously affect the chemical durability thereof, and ultimately the mechanical strength thereof, by interfering with the cement reaction. Consequently, the level of fluoride will preferably not exceed about 2% by weight.

Conventional glass colorants may, where desired, be included in the cement compositions in the customary amounts.

Considerable heat is generated during the reaction, especially when $V_2O_5$ and/or $TiO_2$ comprise part of the composition. Such heat effects a very rapid rate of reaction as a consequence of which the strength of the cement is developed more quickly.

It is recognized that the reactivity of the glass with water will be greater where the particles thereof are very finely-divided. To insure high strength cement bodies, the glass will be comminuted to pass a No. 100 United States Standard Sieve (149 microns) and, preferably, to pass a No. 200 Sieve (74 microns). Glass particles substantially in excess of the stated practical maximum dimensions result in a much slower and often incomplete reaction.

In accordance with well-established hydraulic cement practice, additives or extenders may be incorporated into the cement paste to modify such properties of the final body as strength, chemical durability, and density, as well as setting and cure schedules. Normally, the incorporation of fillers will reduce the rate at which the cement will set. Up to 65% by weight of the inventive glass powders can be replaced by such additions as sand, wollastonite, zircon, diatomaceous earth, Portland cement, feldspar, sawdust, glass fibers, coarse glass particles, organic beads and styrene.

The reaction mechanism involved between the glass powders and water has not been completely elucidated, but is believed to follow the explanation put forward in U.S. Pat. No. 3,720,527, supra. Hence, the rate at which the initial strength of the body develops is directly proportional to the $K_2O$ content of the glass. Inasmuch as the rate of dissolution of an alkali metal silicate glass in water is directly proportional to the alkali metal content thereof, it is believed to be self-evident that the initial reaction is controlled by the rate of dissolution of the glass. Moreover, the ultimate strength of the cement is likewise affected by the alkali metal content thereof. It has then been posited that an inverse relationship exists between alkali metal content and ultimate strength which is the result of increased linkage between the dissolved silica species, i.e., a polymerization process. In essence, then, the silica is hypothesized to first dissolve and subsequently rearrange to a more dense solid silica structure.

A large quantity of heat is generated during the reaction between water and either the silicate or the phosphate content of the instant glasses. This heat promotes a much more rapid rate of reaction, with the consequent development of strength more quickly. It has further been theorized that a phosphate polymer, e.g., $(HPO_4)_x$, the metaphosphate, may also form which can significantly modify the properties of the cement.

Applications for the inventive hydraulic cements are many and varying, ranging from such utilities as oil well shaft fillers, mine road materials, corrosion resistant coatings for shipbottoms, undersea apparati, pilings, and the like, to sealants for multi-paned windows and mirrors.

DESCRIPTION OF SPECIFIC EMBODIMENTS

TABLES I and IA present non-phosphate containing compositions, whereas TABLES III and IIIA present phosphate-containing compositions. TABLES II and IV present properties observed with respect to glasses having the compositions of TABLES I and III, respectively.

TABLES I and III record compositions, expressed in terms of mole percent on the oxide basis, of glasses which, in powder form, will provide the hydraulic cements of the instant invention. TABLES IA and IIIA report the same compositions as recalculated in terms of parts by weight on the oxide basis. Because the sum of the tabulated values totals or very closely approximates 100, for all practical purposes TABLES IA and IIIA may be deemed to show compositions in percent by weight.

TABLE I

|         | 1  | 2  | 3  | 4  | 5  | 6  | 7  | 8  |
|---------|----|----|----|----|----|----|----|----|
| $SiO_2$ | 73 | 71 | 73 | 70 | 64 | 67 | 60 | 60 |
| $K_2O$  | 25 | 25 | 25 | 25 | 26 | 28 | 28 | 30 |
| $Al_2O_3$ | 2 | 4 | — | 5 | 10 | 5 | 2 | — |
| $TiO_2$ | — | — | 2 | — | — | — | — | 10 |
| BaO     | — | — | — | — | — | — | 10 | — |

TABLE I-continued

|           | 9  | 10 | 11 | 12   | 13   | 14   | 15   | 16   |
|-----------|----|----|----|------|------|------|------|------|
| $SiO_2$   | 70 | 63 | 60 | 65.2 | 72.8 | 72.8 | 70.2 | 68.2 |
| $K_2O$    | 25 | 30 | 27 | 22.8 | 22.8 | 22.8 | 22.8 | 22.8 |
| $Al_2O_3$ | —  | 2  | 3  | 10.0 | 2.4  | 2.4  | 5.0  | 5.0  |
| $TiO_2$   | 5  | —  | —  | —    | —    | —    | —    | —    |
| CaO       | —  | 5  | 5  | —    | —    | —    | —    | —    |
| MgO       | —  | —  | 5  | —    | —    | —    | —    | —    |
| $V_2O_5$  | —  | —  | —  | 2.0  | —    | 2.0  | 2.0  | 4.0  |
| $MoO_3$   | —  | —  | —  | —    | 2.0  | —    | —    | —    |

|           | 17   | 18   | 19   | 20   |
|-----------|------|------|------|------|
| $SiO_2$   | 63.2 | 72.8 | 74.3 | 74.3 |
| $K_2O$    | 22.8 | —    | 18.2 | 18.2 |
| $Al_2O_3$ | 10.0 | 2.4  | 2.4  | 2.4  |
| $V_2O_5$  | 4.0  | 2.0  | —    | —    |
| $Na_2O$   | —    | 22.8 | —    | —    |
| $Li_2O$   | —    | —    | 5.1  | —    |
| $Rb_2O$   | —    | —    | —    | 5.1  |
| CuO       | —    | —    | —    | —    |

TABLE IA

|           | 1    | 2    | 3    | 4    | 5    | 6    | 7    | 8    |
|-----------|------|------|------|------|------|------|------|------|
| $SiO_2$   | 63.1 | 60.7 | 63.5 | 59.4 | 52.5 | 56.1 | 45.1 | 49.8 |
| $K_2O$    | 33.9 | 33.5 | 34.2 | 33.3 | 33.5 | 36.8 | 33.1 | 39.1 |
| $Al_2O_3$ | 2.9  | 5.8  | —    | 7.2  | 14.0 | 7.1  | 2.6  | —    |
| $TiO_2$   | —    | —    | 2.3  | —    | —    | —    | —    | 11.1 |
| BaO       | —    | —    | —    | —    | —    | —    | 19.2 | —    |

|           | 9    | 10   | 11   | 12   | 13   | 14   | 15   | 16   |
|-----------|------|------|------|------|------|------|------|------|
| $SiO_2$   | 60.4 | 53.3 | 51.9 | 52.6 | 62.0 | 61.3 | 58.2 | 54.7 |
| $K_2O$    | 33.9 | 39.9 | 36.7 | 28.9 | 30.5 | 30.1 | 29.7 | 28.7 |
| $Al_2O_3$ | —    | 2.9  | 4.4  | 13.7 | 3.5  | 3.4  | 7.1  | 6.8  |
| $TiO_2$   | 5.7  | —    | —    | —    | —    | —    | —    | —    |
| CaO       | —    | 3.9  | 4.0  | —    | —    | —    | —    | —    |
| MgO       | —    | —    | 2.9  | —    | —    | —    | —    | —    |
| $V_2O_5$  | —    | —    | —    | 4.9  | —    | 5.1  | 5.0  | 9.7  |
| $MoO_3$   | —    | —    | —    | —    | 4.1  | —    | —    | —    |

|           | 17   | 18   | 19   | 20   |
|-----------|------|------|------|------|
| $SiO_2$   | 49.3 | 68.4 | 67.9 | 60.5 |
| $K_2O$    | 27.9 | —    | 26.1 | 23.3 |
| $Al_2O_3$ | 13.3 | 3.8  | 3.7  | 3.3  |
| $V_2O_5$  | 9.5  | 5.7  | —    | —    |
| $Na_2O$   | —    | 22.8 | —    | —    |
| $Li_2O$   | —    | —    | 2.3  | —    |
| $Rb_2O$   | —    | —    | —    | 12.9 |
| CuO       | —    | —    | —    | —    |

TABLE III

|           | 21   | 22   | 23   | 24   | 25   | 26   | 27   | 28   |
|-----------|------|------|------|------|------|------|------|------|
| $SiO_2$   | 71.8 | 68.7 | 70.0 | 68.0 | 72.3 | 71.8 | 68.0 | 70.0 |
| $K_2O$    | 22.8 | 21.5 | 21.9 | 22.1 | 22.8 | 22.8 | 22.8 | 22.8 |
| $P_2O_5$  | 2.4  | 2.3  | 2.3  | 2.3  | 2.4  | 2.4  | 2.4  | 2.4  |
| $Al_2O_3$ | 3.0  | 1.9  | 1.9  | 1.9  | 2.5  | 3.0  | 2.0  | 2.0  |
| F         | —    | 5.6  | —    | —    | —    | —    | —    | —    |
| $B_2O_3$  | —    | —    | 3.9  | —    | —    | —    | —    | —    |
| $MoO_3$   | —    | —    | —    | 2.9  | —    | —    | —    | 2.8  |
| CaO       | —    | —    | —    | 2.8  | —    | —    | —    | —    |
| $Li_2O$   | —    | —    | —    | —    | —    | —    | 4.8  | —    |

|           | 29   | 30   | 31   | 32   | 33   | 34   | 35   | 36   |
|-----------|------|------|------|------|------|------|------|------|
| $SiO_2$   | 71.8 | 70.0 | 75.4 | 75.4 | 75.4 | 75.4 | 75.4 | 74.8 |
| $K_2O$    | 22.8 | 22.8 | 20.2 | 18.2 | 20.2 | 20.2 | 18.2 | 22.8 |
| $P_2O_5$  | 3.4  | 4.1  | 2.4  | 2.4  | 2.4  | 2.4  | 2.4  | 2.4  |
| $Al_2O_3$ | 2.0  | 3.5  | —    | —    | —    | —    | —    | —    |
| $V_2O_5$  | —    | —    | 2.0  | 4.0  | —    | —    | —    | —    |
| $MoO_3$   | —    | —    | —    | —    | 2.0  | —    | —    | —    |
| $WO_3$    | —    | —    | —    | —    | —    | 2.0  | 4.0  | —    |

TABLE IIIA

|          | 21   | 22   | 23   | 24   | 25   | 26   | 27   | 28   |
|----------|------|------|------|------|------|------|------|------|
| $SiO_2$  | 60.7 | 60.8 | 59.5 | 55.2 | 61.3 | 60.7 | 59.0 | 57.6 |
| $K_2O$   | 30.2 | 29.9 | 29.2 | 28.3 | 30.3 | 30.2 | 31.1 | 29.4 |
| $P_2O_5$ | 4.8  | 4.8  | 4.6  | 4.4  | 4.8  | 4.8  | 4.9  | 4.7  |

TABLE IIIA-continued

|  |  |  |  |  |  |  |  |  |
|---|---|---|---|---|---|---|---|---|
| $Al_2O_3$ | 4.3 | 2.9 | 2.8 | 2.6 | 3.6 | 4.3 | 2.9 | 2.8 |
| F | — | 1.6 | — | — | — | — | — | — |
| $B_2O_3$ | — | — | 3.9 | — | — | — | — | — |
| $MoO_3$ | — | — | — | 5.7 | — | — | — | 5.5 |
| CaO | — | — | — | 3.7 | — | — | — | — |
| $Li_2O$ | — | — | — | — | — | — | 2.1 | — |

|  | 29 | 30 | 31 | 32 | 33 | 34 | 35 | 36 |
|---|---|---|---|---|---|---|---|---|
| $SiO_2$ | 60.3 | 57.6 | 64.5 | 64.2 | 64.2 | 63.1 | 61.4 | 64.3 |
| $K_2O$ | 30.1 | 29.5 | 27.2 | 24.3 | 27.0 | 26.5 | 23.2 | 30.8 |
| $P_2O_3$ | 6.7 | 8.0 | 4.9 | 4.8 | 4.8 | 4.8 | 4.6 | 4.9 |
| $Al_2O_3$ | 2.9 | 4.9 | — | — | — | — | — | — |
| $V_2O_5$ | — | — | 3.4 | 6.7 | — | — | — | — |
| $MoO_3$ | — | — | — | — | 4.0 | — | — | — |
| $WO_3$ | — | — | — | — | — | 5.6 | 10.8 | — |

Because it is not known with what cations the fluoride is combined, it is merely recited as fluoride, in accordance with conventional glass analysis practice. The actual batch ingredients utilized can be any materials, either the oxide, or other compounds, which, when melted together, are converted into the desired oxide in the proper proportions. The fluoride will commonly be included as KF, but other fluorine-containing compounds may be employed for that purpose.

The batch components were compounded, ballmilled together to insure thorough mixing and to assist in achieving a homogeneous melt, the mixture deposited into platinum or silica crucibles, and the crucibles introduced into an electrically-fired furnace operating at about 1550° C. Glass batches containing transition metal oxides were usually melted in silica crucibles to prevent attack thereby of a platinum crucible. After melting for 4-16 hours, the molten glasses were poured through water-cooled rollers to form ribbon having a thickness of about 1/16"-⅛". The ribbon was subsequently comminuted utilizing conventional ball-milling apparatus to pass a No. 200 United States Standard Sieve. Cement bodies were formed from those powders in the manner described immediately below.

The powders were dispensed into distilled water contained within a glass beaker or a metal vessel used with a high speed shear mixer. The slurry was continuously agitated with a magnetic stirrer, in the case of the glass beaker, or stirred at high speed utilizing a commercial Waring blender.

Customarily, the most desirable overall physical properties are obtained in cements wherein about five parts by weight of glass powder are blended with two parts of water. Where a faster setting cement is desired, the glass frit:water ratio will be reduced to about 2:1. An adequate quantity of water must be present to preclude setting up of the cement during mixing, but, on the other hand, too much water will not permit the cement to set up into a solid body. Accordingly, sufficient glass frit will be available such that the weight ratio glass:water is never less than one, and, to insure substantially complete reaction therebetween, the maximum weight ratio glass:water will not exceed about 4:1. Self-evidently, the temperature of the water will vary between the freezing and boiling points thereof with convenience dictating the use of water at room temperature.

The slurries of glass powder and water were poured into polyethylene vials. Relative heats of formation were determined qualitatively by touching the vial with the hand several times during the reaction period. In Table II, samples adjudged "very hot" were hot to hold in the hand and, particularly with the $TiO_2$-containing glasses, were frequently accompanied with the evolution of steam. Samples reported "hot" could be held in the hand, but uncomfortably. "Warm" and "slightly warm" constituted further subjective classes of lower temperatures, and "cool" designates essentially no noticeable exothermic reaction.

The time required for the cement to set was not rigorously measured; TABLE II records approximate periods of set based upon a showing of any flow properties when the vial was tilted during observations for heat generation. As soon as a sample was considered to be completely set, the cement body was removed from the vial and allowed to dry in air.

The most desirable cement mixtures are customarily thixotropic prior to setting, that phenomenon being characteristic of Portland cement and paints in general. Mixtures evidencing dilatancy normally result in poor setting cements and the cements, themselves, are frequently brittle and granular. Still other mixtures may separate into solid and liquid layers with some cement formation, indicating low stability.

It will be appreciated that the maximum reaction temperature occurring during the setting process will not exceed 100° C., this temperature being restricted because of the release (volatilization) of adsorbed water. Hence, until excess and adsorbed water is eliminated from the mixture, the reaction temperature will not exceed the boiling point of water.

The resistance of the cements to atmospheres containing high moisture contents was examined by exposing samples thereof in humidity chambers to conditions of 92% relative humidity at 40° C. or 100% relative humidity at 50° C. Table II illustrates that, after full cure, the inventive products remain intact generally with little distortion after extended exposure to such conditions.

TABLE II also records compressive strength measurements undertaken on cylindrical specimens having a diameter of 3 cm and a length of 8 cm. Values in excess of 6000 psi are commonplace on samples where inclusions and defects are minimized.

As was observed above, the samples of cement were removed from the polyethylene vials after complete setting had been deemed to have occurred. The normal practice was to stand the samples on end on a paper towel to air dry at room temperature. Specimens reserved for examining their resistance to moisture-laden atmospheres were air dried for 30 days prior to introduction into a humidity cabinet. Accelerated drying with essentially no cracking or foaming is possible with $Al_2O_3$-containing glasses in an oven operating at temperatures up to 200° C. Nevertheless, exposure to temperatures in excess of 250° C. invariably induced foaming in the specimens. It has been posited that such foaming is quite likely related to the release of adsorbed water. Conducting the heating in a vacuum appeared to increase the foaming problem.

To promote a greater understanding of the structure and overall character of the inventive cements, samples thereof were subjected to such analytical techniques as differential thermal analysis (DTA), thermogravimetric analysis (TGA), X-ray diffraction analysis (XRD), and infrared radiation analysis (IR). DTA illustrated the presence of two endothermic peaks, one at about 100°-200° C. and another at about 500°-525° C. TGA confirmed that those peaks were caused through a loss of weight and not the result of another phase transition.

It is well known that surface water (adsorbed) is volatilized at temperatures around the boiling point thereof, viz., 100° C., whereas chemisorbed or "constitutional" water is driven off at temperatures up to 600° C. XRD produced a diffuse pattern characteristic of the amorphous state. IR spectra appeared similar to that of hydrated silica gel with a broad band at about 3000 cm$^{-1}$, which is attributed to the OH stretching frequency, along with the fundamental frequency of water at 1600 cm$^{-1}$.

Water-soluble, polar organic liquids may be added to the cement-water mixture, but such appear to slow the reaction. For example, upon the addition of methanol, the slurry remained cold, that factor being deemed to result from evaporation of the alcohol. Furthermore, the reaction proceeded very slowly with no benefit in the properties of the final product being observed.

tack. Moreover, its strength is about one-half or less of that displayed by the inventive cements. A sample of Example 21 was immersed into tap water at room temperature for nine days. No evidence of deterioration in physical properties and creep resistance was observed in the sample upon its withdrawal from the water.

As was noted above, the use of extenders or fillers can beneficially modify the properties of the cement. For example, an addition of 30% by weight feldspar to Example 25 will increase the tensile strength thereof from 1000 psi to 3000 psi. Also, the addition of up to 30% by weight of sand having a grain size to pass a No. 200 United States Standard Sieve allows the cement of Example 28 to be fired to 720° C. without foaming or distortion. Additions of up to 50% of the same filler extend the firing range to 800° C. Slabs up to 2 cm thick have been fired successfully without foaming or major

TABLE II

| Example No. | Heat Evolved in Setting | Set Time (Minutes) | Cement Quality | Creep Under Own Weight | 92% Relative Humidity 40° C. - 6 Days | Compressive Strength |
|---|---|---|---|---|---|---|
| 1 | Warm | 15 | Slightly hygroscopic | Slight | Slight creep | 2800 psi |
| 2 | Cool | 30 | Slightly hygroscopic | Slight | Slight creep | 2500 psi |
| 3 | Warm | 15 | Slightly hygroscopic | Slight | Slight creep | 1380 psi |
| 4 | Warm | 22 | Hard, opaque | Slight | Stable, No change | 6350 psi |
| 5 | Cool | 35 | Hard, granular | None | Stable, No Change | 3300 psi |
| 6 | Very Hot | ~3 | Hard, translucent, slightly hygroscopic | — | Stable, tacky surface | 6800 psi |
| 7 | Very Hot, Steam | ~3 | Hard, translucent, foamed | — | Stable, tacky surface | 7180 psi |
| 8 | Very Hot, Steam | 20 | Hard, hygroscopic, translucent | — | Stable, tacky surface | 7400 psi |
| 9 | Very Hot, Steam | 10 | Hard, translucent, foamed | — | Stable, tacky surface | 6600 psi |
| 10 | Very Hot, Steam | ~8 | Hard, translucent, foamed | — | Stable, tacky surface | 7800 psi |
| 11 | Slightly Warm | 18 | Hard, opaque | None | Stable, no change | 6900 psi |
| 12 | Hot | ~60 | Hard, granular, opaque | None | Stable, no change | 6200 psi |
| 13 | Hot | 20 | Hard, granular, translucent, hygroscopic | Yes | Deformed | 6500 psi |
| 14 | Hot | 20 | Hard, translucent | Slight | Slight creep | 6400 psi |
| 15 | Very Hot | 10 | Hard, translucent | Slight | Slight creep | 7200 psi |
| 16 | Very Hot | 10 | Hard, translucent | Slight | Slight creep | 7600 psi |
| 17 | Warm | 30 | Hard, granular, opaque | None | Stable, no change | 6450 psi |
| 18 | Slightly Warm | >180 | Hard, granular, chalky | None | Stable, no change | <1000 psi |
| 19 | Slightly Warm | >180 | Hard, partly translucent | None | Stable, tacky surface | <1000 psi |
| 20 | | 20 | Hard, translucent | None | Stable, tacky surface | 5800 psi |

TABLE IV

| Example No. | Heat Evolved in Setting | Set Rate | Creep Under Own Weight | 92% Relative Humidity 40°-0 C. - 6 Days | Modulus of Rupture |
|---|---|---|---|---|---|
| 21 | Very Hot | Very Fast | No | No Creep; Strong | — |
| 22 | Hot | Medium Fast | No | No Creep; No Cracking; Strong | 4100 psi |
| 23 | Cold; No Reaction | Slow | No | No Creep; No Cracking; Strong | — |
| 24 | Warm | Slow | No | No Creep; Strong | — |
| 25 | Very Hot | Very Fast | No | — | — |
| 26 | Very Hot | Very Fast | No | — | — |
| 27 | Warm | Medium Fast | No | — | — |
| 28 | Very Hot | Fast | No | — | — |
| 29 | Very Hot | Very Fast | No | — | — |
| 30 | Very Hot | Very Fast | No | — | — |
| 31 | Very Hot | Very Fast | No | No Creep; No Cracking; Strong | 6500 psi |
| 32 | Very Hot | Very Fast | No | No Creep; No Cracking; Strong | 3800 psi |
| 33 | Very Hot | Very Fast | No | No Creep; No Cracking; Strong | 9200 psi |
| 34 | Very Hot | Very Fast | No | No Creep; No Cracking; Strong | 6900 psi |
| 35 | Very Hot | Very Fast | No | No Creep; No Cracking Strong | 4200 psi |
| 36 | Very Hot | Very Fast | Yes | Complete Flow | 2200 psi |

Example 36 represents a typical cement of the class disclosed in U.S. Pat. No. 3,720,527. As can be seen from Table IV, the cement is very fast setting but it suffers from creep and poor resistance to moisture attack. When heated to 900° C., however, the cement bodies become glazed and slightly softened, with a volume shrinkage of about 40%.

Films or coatings of the inventive hydraulic cements can be applied to a wide variety of substrates and, in many instances, manifest tenacious adherence thereto. Such substrates include glass, glass-ceramics, ceramics, and metals. The cements do not, however, adhere to either polyethylene or fluorocarbons.

Integral thin films of the inventive cements have been prepared. In one procedure glass powder was mixed with an excess of water, i.e., up to a 1:1 weight ratio of glass to water, to produce a watery slurry exhibiting a slow setting time, viz., greater than six hours. The slurry was centrifuged to concentrate the fine particles and then decanted into fluorocarbon molds for curing and drying. The resultant sheets were clear, transparent films which were resilient and rubbery to the touch. It required about two weeks at room temperature to attain full cure, at which time the films were less transparent and resilient. Thus, with full cure the films become brittle and translucent, i.e., they take on the properties of glass. Films having thicknesses of about 1–5 mm and up to 50 mm square have been produced in that manner.

We claim:

1. A hydraulic cement exhibiting high mechanical strength, long term durability against attack by water, and, after curing, essential freedom from creep, said cement composed of glass powders consisting essentially, expressed in terms of mole percent on the oxide basis, of about 60–76% $SiO_2$, 15–30% $K_2O$, and 2–15% total of at least one metal oxide selected from the group of 0–10% $Al_2O_3$, 0–5% $V_2O_5$, 0–5% $TiO_2$, 0–5% $MoO_3$, and 0–5% $WO_3$.

2. A hydraulic cement according to claim 1 wherein said glass powders contain 15–25% $K_2O$, 2–4% $Al_2O_3$, and 2–4% $V_2O_5$ and/or $TiO_2$.

3. A hydraulic cement according to claim 1 wherein said glass powders also contain up to 10 mole percent total of at least one component selected from the group of BaO, $B_2O_3$, $Bi_2O_3$, CaO, CdO, CoO, $Cr_2O_3$, $Cs_2O$, F, $Fe_2O_3$, $Li_2O$, MgO, $MnO_2$, $MoO_3$, $Na_2O$, NiO, PbO, $Sb_2O_3$, $Rb_2O$, SrO, ZnO, and $ZrO_2$.

4. A hydraulic cement according to claim 3 wherein an individual component of the group will not be present in an amount exceeding 5 mole percent.

5. A hydraulic cement according to claim 1 composed of glass powders consisting essentially, expressed in terms of mole percent on the oxide basis, of about 18–24% $K_2O$, 68–76% $SiO_2$, 2–4.5% $P_2O_5$, the molar ratio $K_2O:P_2O_5$ ranging between 5–10, and 2–5% total of at least one metal oxide selected from the group of $Al_2O_3$, $MoO_3$, $V_2O_5$, and $WO_3$.

6. A hydraulic cement according to claim 5 wherein said molar ratio $K_2O:P_2O_5$ ranges between 8.5–9.5.

7. A method for preparing a body of hydraulic cement exhibiting high mechanical strength, long term durability against attack by water, and essential freedom from creep which comprises the steps of:
(a) melting a batch for a glass consisting essentially, expressed in terms of mole percent on the oxide basis, of about 60–76% $SiO_2$, 15–30% $K_2O$, and 2–15% total of at least one metal oxide selected from the group of 0–10% $Al_2O_3$, 0–5% $V_2O_5$, 0–5% $TiO_2$, 0–5% $MoO_3$, and 0–5% $WO_3$.
(b) cooling said melt to a glass body;
(c) reducing said glass body to a powder passing a No. 100 United States Standard Sieve;
(d) admixing water to said glass powder at temperatures between the freezing and boiling point of the water in powder-to-water weight ratios ranging between about 1:2–4:1; and thereafter
(e) maintaining said mixture within said temperature range for a period of time sufficient to cure same to a solid body.

8. A method according to claim 7 wherein said glass contains 15–25% $K_2O$, 2–4% $Al_2O_3$, and 2–4% $V_2O_5$ and/or $TiO_2$.

9. A method according to claim 7 wherein said glass also contains up to 10 mole percent total of at least one component selected from the group of BaO, $B_2O_3$, $Bi_2O_3$, CaO, CdO, $Cr_2O_3$, $Cs_2O$, F, $Fe_2O_3$, $Li_2O$, MgO, $MnO_2$, $MoO_3$, $Na_2O$, NiO, PbO, $Rb_2O$, SrO, ZnO, and $ZrO_2$.

10. A method according to claim 9 wherein an individual component of the group will not be present in an amount exceeding 5 mole percent.

11. A method according to claim 7 wherein said glass consists essentially, expressed in terms of mole percent on the oxide basis, of about 18–24% $K_2O$, 68–76% $SiO_2$, 2–4.5% $P_2O_5$, the molar ratio $K_2O:P_2O_5$ ranging between 5–10, and 2–5% total of at least one metal oxide selected from the group of $Al_2O_3$, $MoO_3$, $V_2O_5$, and $WO_3$.

12. A method according to claim 11 wherein the molar ratio of $K_2O:P_2O_5$ ranges between 8.5 and 9.5.

13. A method according to claim 7 wherein said powder-to-water ratio is about 5:2.

14. A method according to claim 7 wherein said glass contains at least 2% $Al_2O_3$ and said mixture is heated to temperatures up to about 250° C. for a period of time sufficient to eliminate adsorbed water and cure the mixture to a solid body.

* * * * *